US 7,085,798 B2

(12) United States Patent
Kim et al.

(10) Patent No.: US 7,085,798 B2
(45) Date of Patent: * Aug. 1, 2006

(54) SENSE-AMP BASED ADDER WITH SOURCE FOLLOWER PASS GATE EVALUATION TREE

(75) Inventors: Jae-Joon Kim, West Lafayette, IN (US); Ching-Te K. Chuang, South Salem, NY (US); Rajiv V. Joshi, Yorktown Heights, NY (US); Kaushik Roy, West Lafayette, IN (US)

(73) Assignee: International Business Machines Corporation, Armonk, NY (US)

( * ) Notice: Subject to any disclaimer, the term of this patent is extended or adjusted under 35 U.S.C. 154(b) by 433 days.

This patent is subject to a terminal disclaimer.

(21) Appl. No.: 10/167,276

(22) Filed: Jun. 10, 2002

(65) Prior Publication Data

US 2003/0229661 A1     Dec. 11, 2003

(51) Int. Cl.
*G06F 7/50*     (2006.01)
(52) U.S. Cl. ...................... 708/714; 708/712
(58) Field of Classification Search ............. 708/710, 708/712, 714, 702, 704
See application file for complete search history.

(56) References Cited

U.S. PATENT DOCUMENTS 5,719,803 A * 2/1998 Naffziger ................ 708/710

6,055,557 A * 4/2000 Beck et al. ................ 708/700

OTHER PUBLICATIONS

Matsui et al., "A 200 MHz 13 mm²2-D DCT Macrocell Using Sense-Amplifying Pipeline Flip-Flop Scheme", IEEE Journal of Solid-State Circuits, vol. 29. No. 12, Dec. 1994, pp. 1482-1490.
Lai et al. "Design and Implementation of Differential Cascode Voltage Switch with Pass-Gate (DCVSPG) Logic for High-Performance Digital Systems", IEEE Journal of Solid-State Circuits, vol. 32. No. 4, Apr. 1997, pp. 563-573.
Grotjohn et al., "Sample-Set Differential Logic (SSDL) for Complex High-Speed VLSI", IEEE Journal of Solid-State Circuits, vol. Sc-21. No. 2, Apr. 1986, pp. 367-368.
Pong-Fei Lu et al., "Floating-Body Effects in Partially Depleted SOI CMOS Circuits", IEEE Journal of Solid-State Circuits, vol. 32. No. 8, Aug. 1997, pp. 1241-1253.

(Continued)

*Primary Examiner*—Tan V. Mai
(74) *Attorney, Agent, or Firm*—Satheesh K. Karra; Harrington & Smith, LLP (57) ABSTRACT

A 64-bit adder implemented in partially depleted silicon on insulator technology and having two levels of lookahead uses a dynamic eight-bit carry module containing a differential pass-gate evaluation tree employing a chain of source followers that feeds a sense amplifier, thereby obtaining benefits from high initial drive, low variation in body voltage, resulting in low variation in history-dependent delay, reduced noise sensitivity and noise-based delay.

17 Claims, 11 Drawing Sheets

OTHER PUBLICATIONS

Park et al., "470ps 64bit Parallel Binary Adder", VLSI Circuits Digest of Technical Papers, 2000, pp. 192-193.

Jae-Joon Kim et al., "SOI-Optimized 64-bit High-Speed CMOS Adder Design", School of Electrical and Computer Engineering, Purdue University, 2002.

Lu, "Implementation of Iterative Networks with CMOS Differential Logic", IEEE Journal of Solid-State Circuits, vol. 23. No. 4, Aug. 1988, pp. 1013-1017.

Naffziger, "SP22.5: A Sub-Nanosecond 0.5μm 64b Adder Design", ISSCC96/Session 22/Microprocessing Functional Blocks & Circuits/Paper SP22.5, Feb. 10, 1996.

* cited by examiner

SENSE-AMP BASED ADDER WITH SOURCE FOLLOWER PASS GATE EVALUATION TREE

FIELD OF THE INVENTION

The field of the invention is that of high speed CMOS logic, in particular that of lookahead adders.

BACKGROUND OF THE INVENTION

In the field of high speed CMOS circuits, there have been several efforts to reduce the delay of high fan-in circuits by using the dynamic differential circuit and sense-amplifier (sense-amp) together. Recent circuit styles use differential pass-transistor logic for the logic evaluation tree.

Figure 1A:
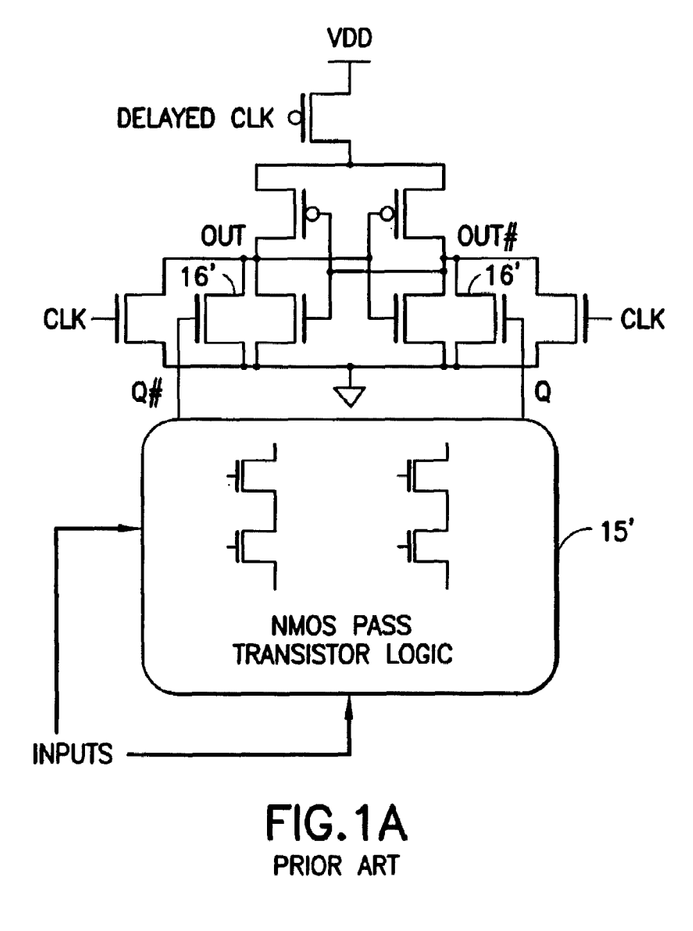
FIGS. 1A and 1B illustrate in simplified form logic modules used in the prior art and in the invention, respectively.

FIG. 1A shows in simplified form, a prior art circuit diagram, including sense amp 1 and logic evaluation circuit 15'. The CLK signals are applied to equilibrate the OUT and OUT# nodes (using the convention that OUT# means the logic complement of OUT) of the sense-amp to ground and the delayed CLK signal opens a current path to VDD. In the precharge mode (when CLK is high) every internal nodes in the logic tree 15' is floating. In the evaluation mode (When CLK is low), pass-gate logic tree circuit 15' performs the logic analysis and applies the differential input to nodes Q and Q#. This differential input causes a corresponding difference of currents through the two NMOS transistors 16'. Sense amp 1 will respond to the differential signal once the difference exceeds the noise level and will drive nodes OUT and OUT# to the rails.

SUMMARY OF THE INVENTION

The invention relates to a multi-bit high speed adder employing a two level lookahead carry structure.

A feature of the invention is a 64-bit adder implemented in partially depleted silicon on insulator technology and having only two levels of lookahead carry implemented in sense-amp based differential logic.

Another feature of the invention is the use of a dynamic eight-bit carry module containing a pass-gate evaluation tree employing a chain of source follower gate transistors that feeds a sense-amplifier.

Yet another feature of the invention is the use of partially depleted silicon on insulator technology in the evaluation tree, thereby obtaining benefits from high initial drive, low variation in body voltage, resulting in low variation in history-dependent delay, reduced noise sensitivity and noise-based delay.

BEST MODE OF CARRYING OUT THE INVENTION

Figure 1B:
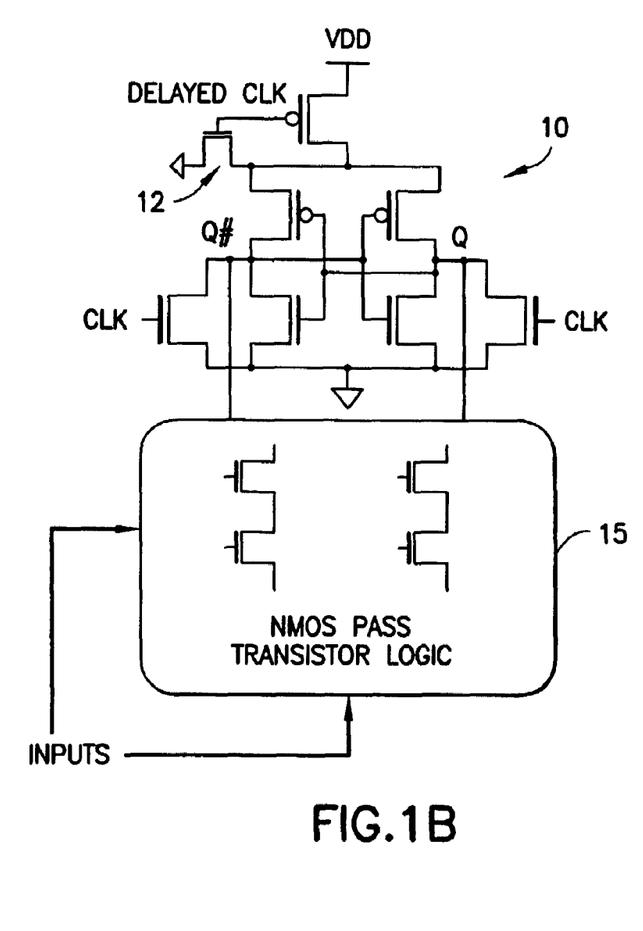

FIG. 1B shows a differential circuit according to the invention with sense amp 10 and logic tree 15 employing pass-gate transistors. The CLK signals equilibrate the Q and Q# nodes of the sense-amp 10 and selected intermediate nodes in the logic tree to ground in the predischarge mode and the delayed CLK signal opens a current path to VDD in the evaluation mode. In operation, the power supply raises the voltage of node Q# (assuming for purposes of illustration that this is the node that will go high) and it triggers the sense-amp. Once the sense-amp is enabled, noise current flows to both output nodes because PMOS's in the sense-amp are initially turned on. The noise charge at the node Q is discharged to ground through the NMOS in the sense-amp and a path to the ground in the pass-gate logic evaluation tree 15, since this node is going low. The noise charge at the node Q# is discharged to VDD through the PMOS in the sense-amp and a path to the VDD in the logic evaluation tree 15, since this node is going high.

Figure 2A:
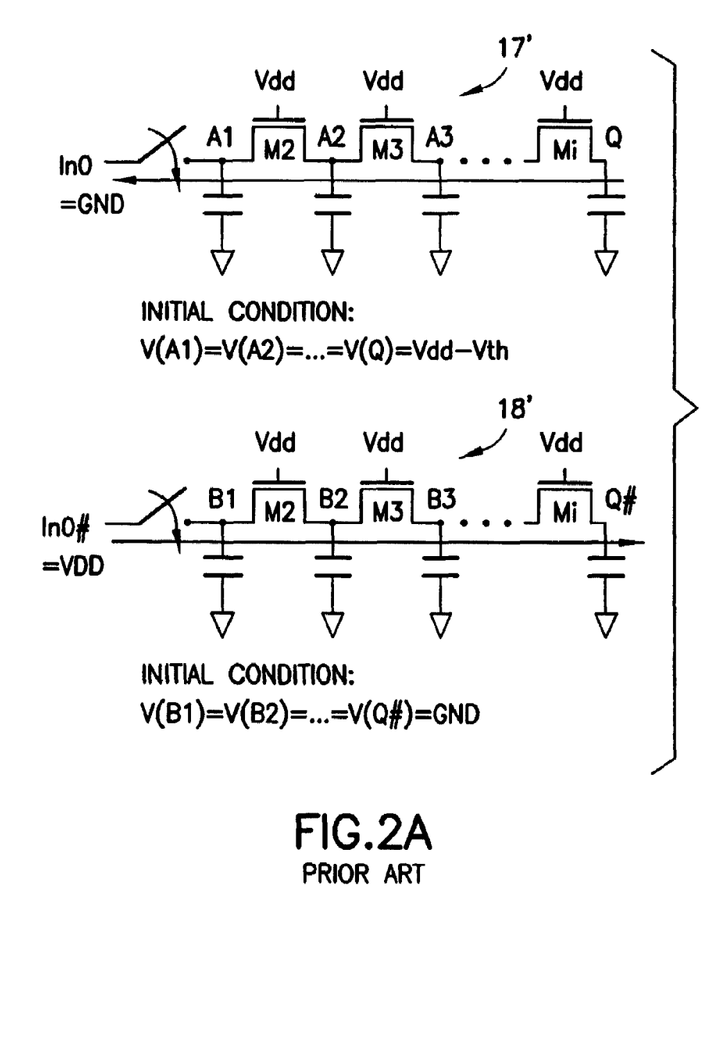
FIGS. 2A and 2B illustrate simplified logic in the worst delay case of the prior art and the invention, respectively.
Figure 2B:
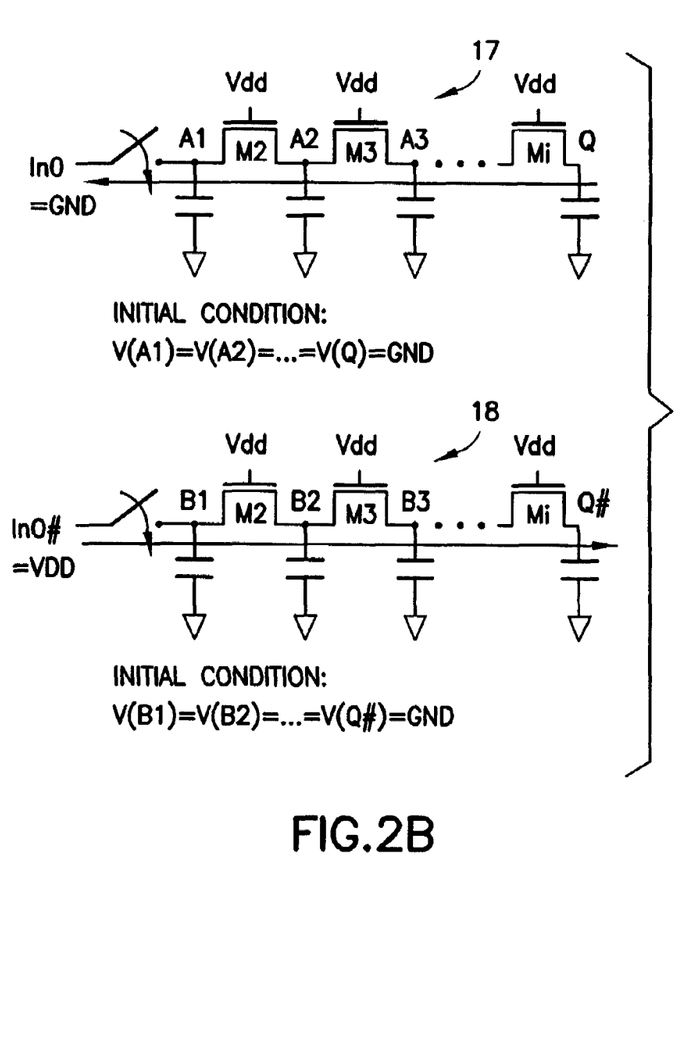

FIGS. 2A and 2B illustrate the worst delay case condition of the prior art and the invention, respectively. In FIG. 2A (following the convention that the A portion of the Figure represents the prior art), the worst delay condition occurs when every intermediate node in one of the differential paths goes down to ground from Vdd-Vth and every intermediate node in the other goes up to Vdd-Vth from ground in the evaluation mode. This condition can be realized when the every pass-transistor in a path is turned on and the leftmost input signal switches in the consecutive evaluation cycles. That is to say, the worst delay case happens if the charged path in the previous cycle is discharged and the previously discharged path is charged in the following cycle. Note that this condition can occur because every intermediate node is floating in the predischarge mode. In contrast, the voltage of every intermediate node in FIG. 2B is forced to ground in the predischarge mode. Thus, the worst delay condition occurs when every intermediate node in one of the differential paths goes up to Vdd-Vth from ground and every intermediate node in the other path stays at ground. The input condition for this worst delay case is same as the condition in FIG. 2A.

Figure 3A:
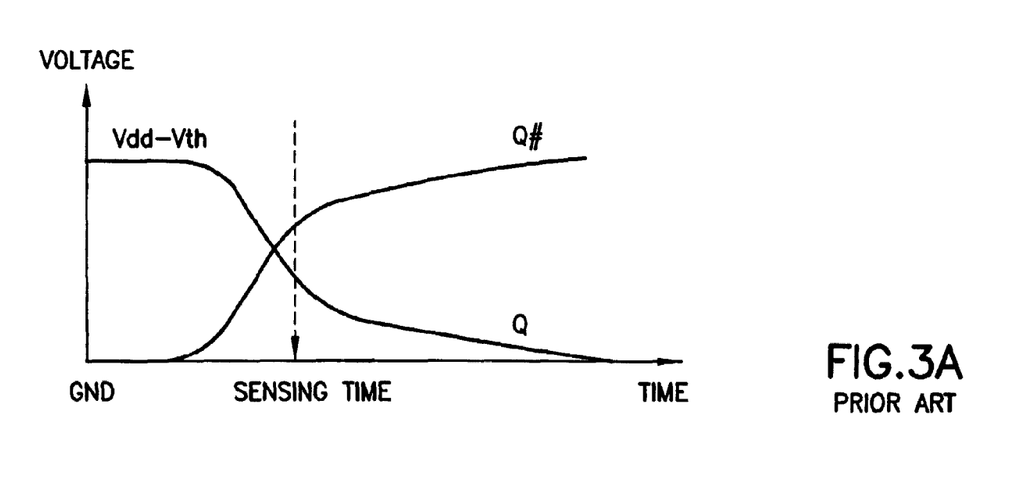
FIGS. 3A and 3B illustrate the waveform of two bit lines in the worst case of the prior art and the invention, respectively.
Figure 3B:
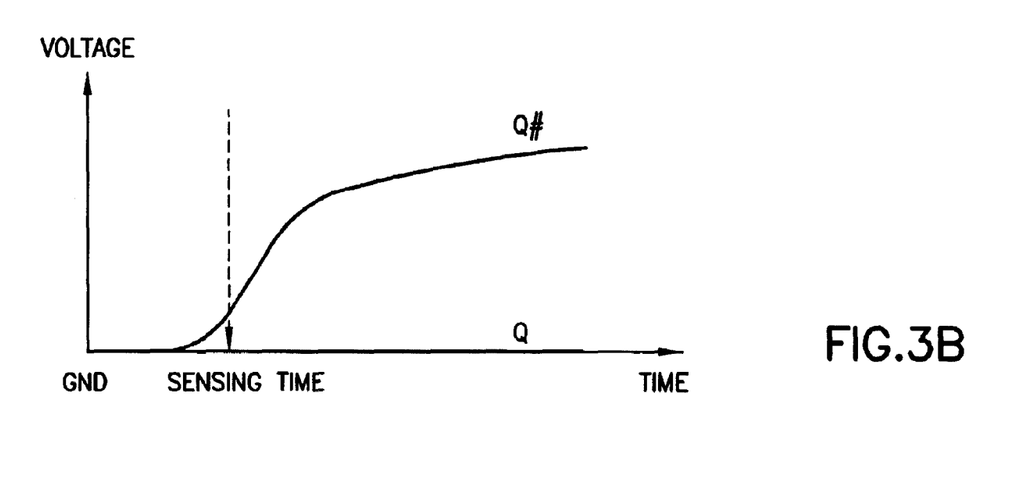

FIGS. 3A and 3B illustrate the waveforms of Q and Q# of the respective circuits in the worst delay case mentioned in FIGS. 2A and 2B. In FIG. 3A, the voltage of Q goes down to ground from Vdd-Vth and the voltage of Q# goes up to Vdd-Vth from ground, and hence the sensing of the difference of the two inputs can be performed when the voltage of Q# becomes higher than Q after they cross. In FIG. 3B, on the contrary, the voltage of Q and Q# starts from the same initial voltage (ground). While the voltage of Q# goes up high, voltage of Q stays at ground, so that the time required for the safe sensing is much smaller than in FIG. 3A.

Figure 4A:
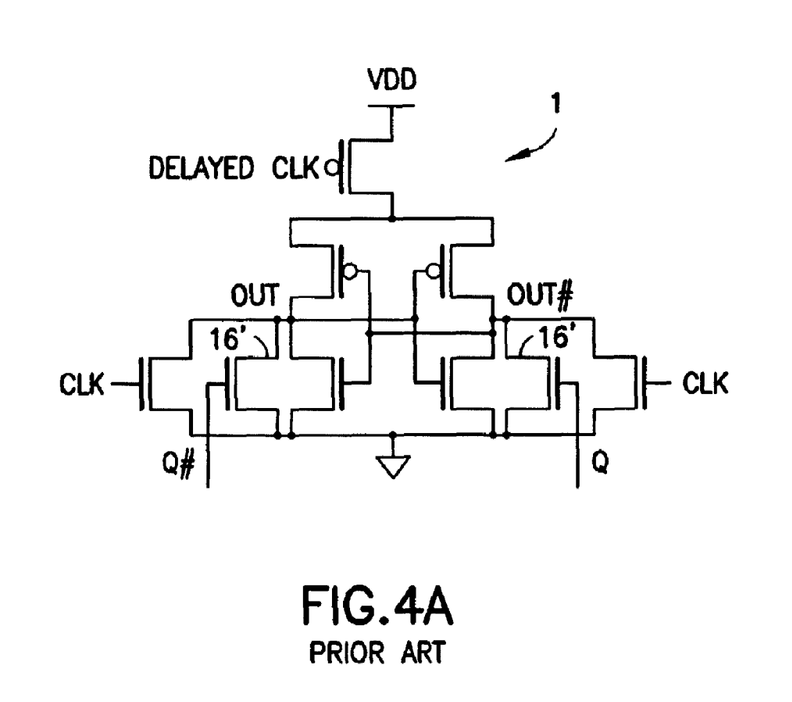
FIGS. 4A and 4B illustrate the sense-amplifiers used in the prior art and the invention, respectively.
Figure 4B:
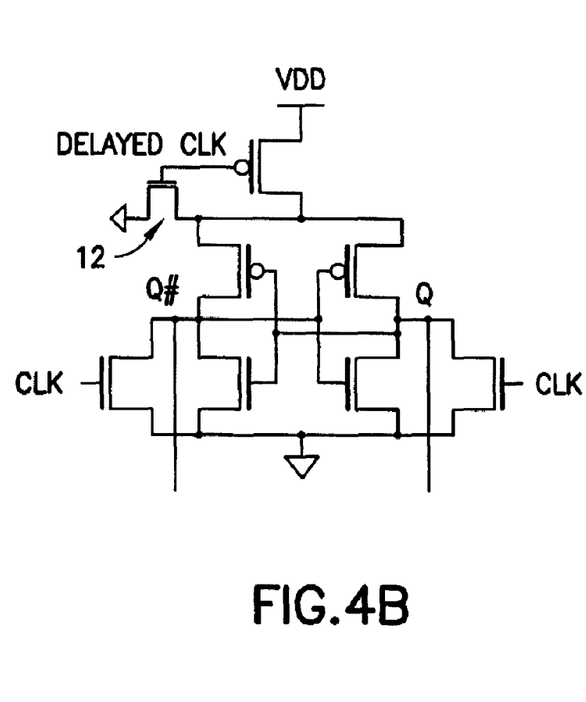

FIGS. 4A and 4B illustrate the sense-amplifiers used in the respective circuits. In FIG. 4A, the output (OUT and OUT#) and input (Q and Q#) of sense-amplifier are decoupled. A different amount of current flows through two input gate transistors 16' according to the differential inputs and it triggers the full swing of back-to-back inverters. In this structure, the input gate transistors 16' cannot sense the voltage difference if both inputs are below the threshold voltage because both NMOS transistors 16' are turned off in the condition. Therefore, at least one of the input voltages should be higher than the threshold voltage of the transistor for the sense-amplification. In FIG. 4B, a simple sense-amplifier composed of back-to-back inverter is used. This sense-amplifier can sense the voltage difference even if both inputs are below the threshold voltage because the voltage difference causes the difference of current through PMOS's. Transistor 12 prevents the drain node of top PMOS from floating for reliability of sense-amplifier.

In addition to the foregoing, one of the differential paths in the prior art circuit precharges the sources and drains high, so that the body voltage variation is greater than in circuits according to the invention. In the path of the prior art where the source and drain voltages are high, the body is at a high voltage, so that when the gate goes high, the body voltage becomes higher than the supply voltage because there is no gate inversion layer to shield the gate-to-body coupling. The body subsequently loses charge in following cycles, so that the variation of body voltage across the circuit is large. In circuits according to the invention, the sources and drains of the pass transistors are predischarged to ground. When the gate goes high, the gate-to-body coupling occurs while the gate voltage is smaller than Vth. Once the gate voltage passes Vth, the inversion layer provides shielding, so that the body voltage variation is much smaller in circuits according to the invention than in the prior art. Because delay variation is proportional to body voltage variation, circuits according to the invention have smaller delay variation than do corresponding circuits constructed according to the prior art.

Figure 7:
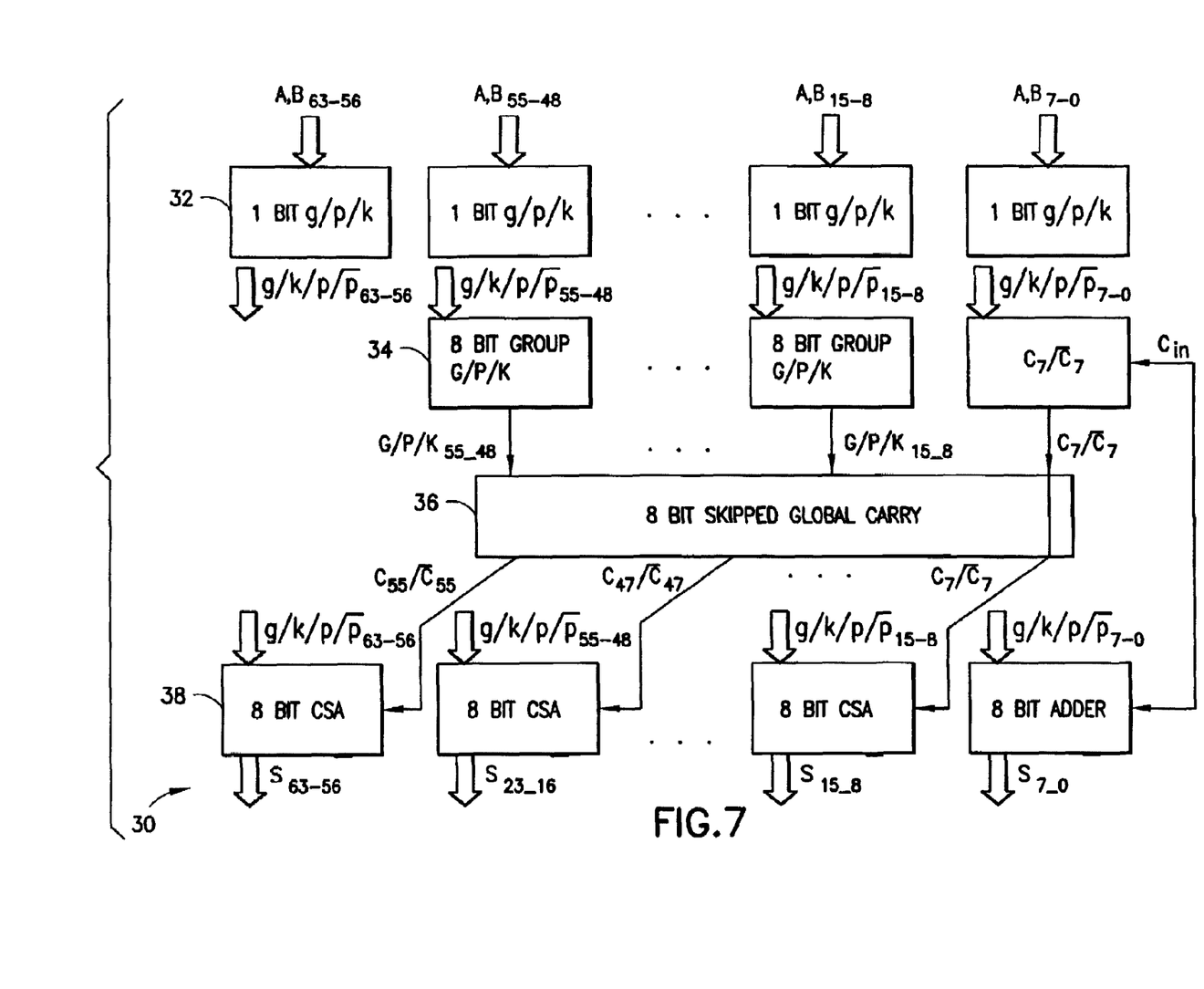
FIG. 7 illustrates an adder according to the invention.

Referring now to FIG. 7, there is shown a block diagram of a 64-bit adder 30 using the invention. At the top, eight circuits 32 contain a set of single-bit circuits that form generation, propagation and kill signals using $g_j/p_j/p_j\#/k_j$ (j=0–63) according to the following:

$$g_1 = Ai \cdot Bi, \; p_1 = Ai \oplus Bi, \; k_i = Ai\_not \cdot Bi\_not \quad \text{Definition 1:}$$

Those skilled in the art will appreciate that gi, pi and ki are mutually exclusive; i.e. for each i, one and only one of gi, pi or ki will be logic 1. Those skilled in the art will be easily able, in the light of this disclosure, to construct one-bit domino circuits to generate $g_1$, $p_1$, and $k_1$.

On the next row, 8-bit circuits 34 generate corresponding eight-bit signals G,P and K according to Definition 2:

$$G_{i+7\_i} = g_{i+7} + p_{i+7}g_{i+6} + \ldots + (p_{i+7} \ldots p_{i+1})g_i$$
$$K_{i+7\_i} = k_{i+7} + p_{i+7}k_{i+6} + \ldots + (p_{i+7} \ldots p_{i+1})k_i$$
$$P_{i+7\_i} = p_{i+7}p_{i+6}p_{i+5}p_{i+4}p_{i+3}p_{i+2}p_{i+1}p_i$$
$$G_{i+7\_i}\# = K_{i+7\_i} + P_{i+7\_i}$$
$$\quad = k_{i+7} + p_{i+7}k_{i+6} + \ldots + (p_{i+7} \ldots p_{i+1})(k_i + p_i)$$
$$K_{i+7\_i}\# = G_{i+7\_i} + P_{i+7\_i}$$
$$\quad = g_{i+7} + p_{i+7}g_{i+6} + \ldots + (p_{i+7} \ldots p_{i+1})(g_i + p_i)$$
$$P_{i+7\_i}\# = p_{i+7}\# + p_{i+6}\# + \ldots + p_{i+1}\# + p_i\#$$

where, $j = i, i+1, \ldots, i+7$ and $i = 0, 7, \ldots, 47$ $G_{i+7,\,i}$, $P_{i+7,i}$ and $K_{i+7,i}$ are also mutually exclusive.

Figure 6A:
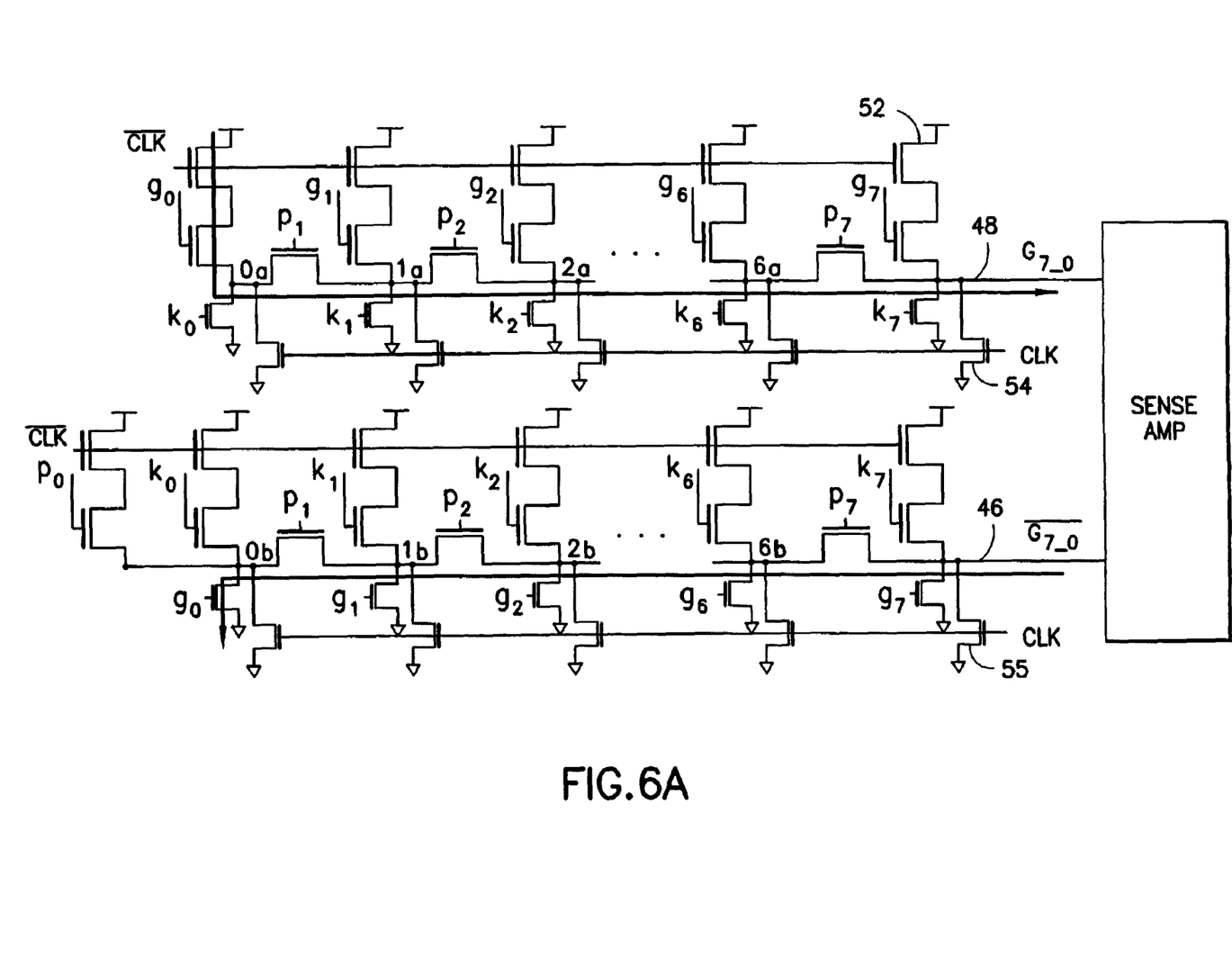
FIGS. 6A, 6B, and 6C illustrate logic modules for generating G,P,K signals.
Figure 6B:
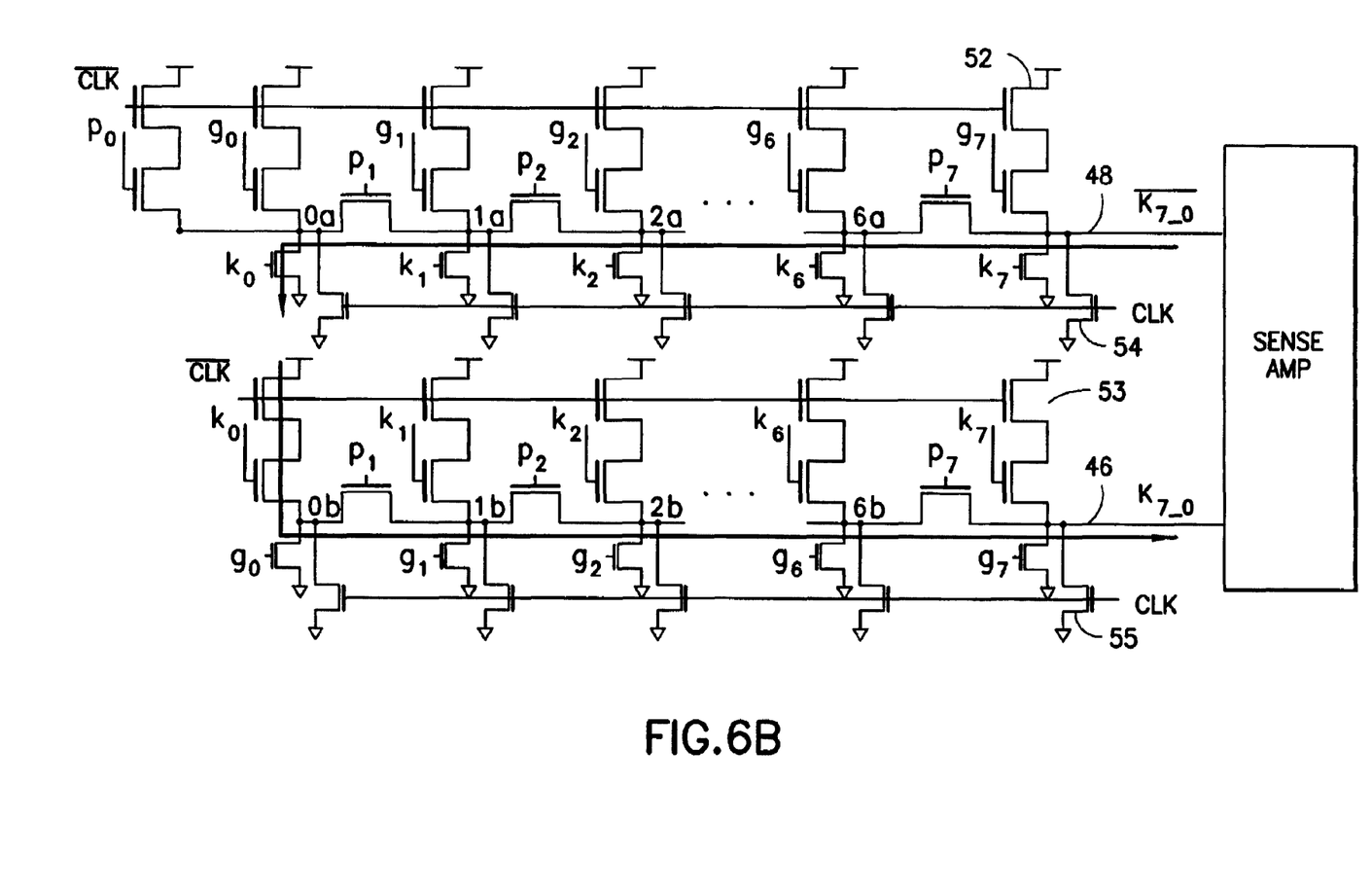
Figure 6C:
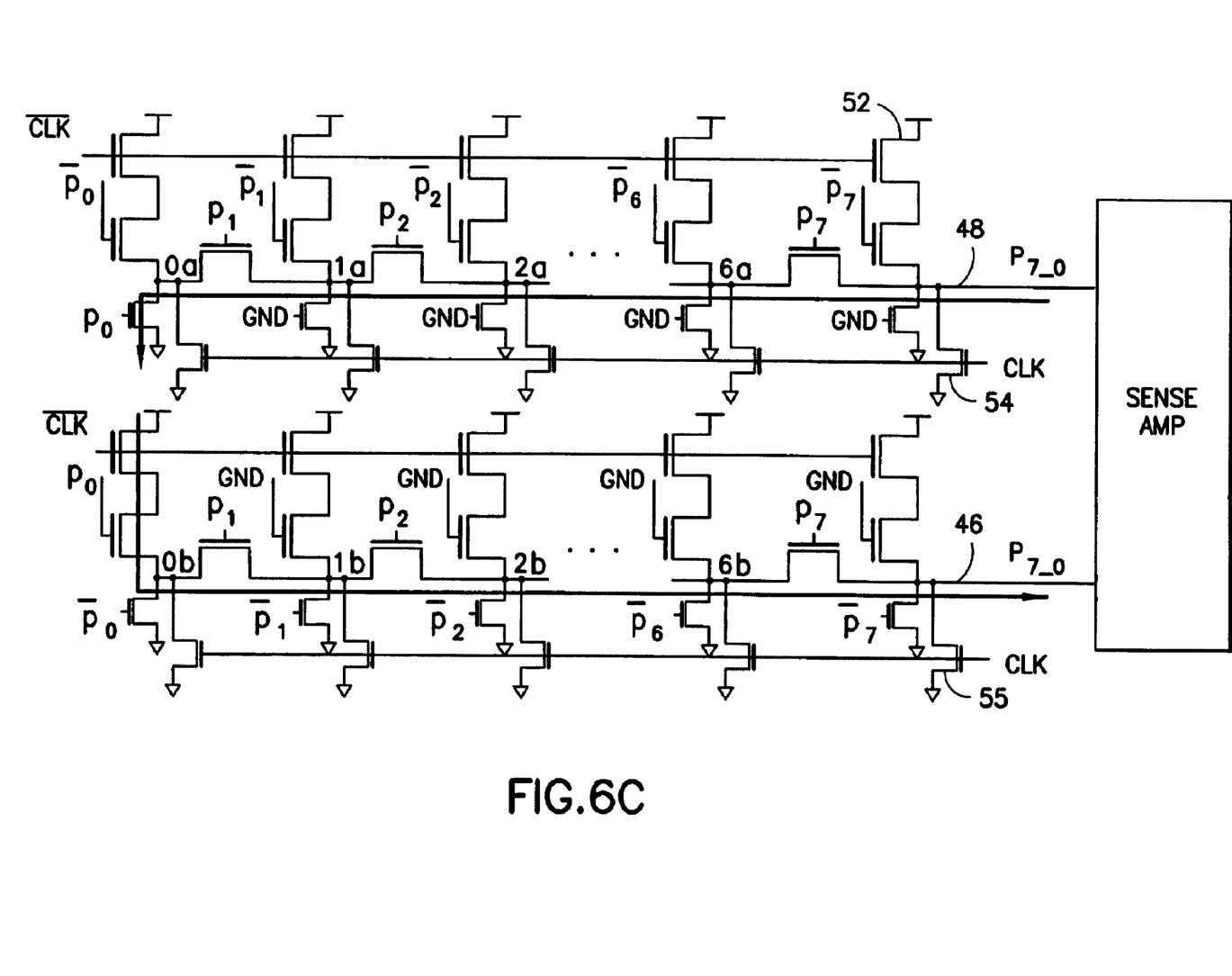

Referring now to FIG. 6, there are shown 3 examples of a circuit 34 according to the invention that perform the logic operations in Definition 2.

Sense amps 10 are shown in FIG. 1B. The remainder of the circuits are examples of the logic tree 15 that carries out the logic operations in Definition 2. FIG. 6A generates G and G#, FIG. 6B generates K, K# and FIG. 6C generates P, P#. At the top and bottom of each module, nodes 48, 46 and intermediate nodes (0a–6a, 0b–6b) are predischarged to ground through transistors 54 and 55 when CLK is high.

In the upper branch of FIG. 6A, the set of signals $G_i$ are applied to the NFET transistors connecting intermediate nodes (0a–6a) in node 48 to Vdd through the clocked transistors 52. Likewise for the set $K_1$ and ground. In the lower branch, the $G_1$ and $K_1$ are used in the opposite locations. The set of transistors 52 and 53 controlled by Clk# serve to isolate the central chain from Vdd during the precharge period and provide a path to Vdd during the evaluation mode.

During the precharge period, the two bit lines 46 and 48, and intermediate nodes (0a–6a, 0b–6b) are pre-discharged to ground through the CLKed NMOS 54 and 55 in the bottom of each chain. During the evaluation mode, the sense amp will connect one of the bit lines to the supply voltage and the other one to ground.

In operation, each node of chains 46 and 48 will be connected to either Vdd or ground, since the individual $G_1$ and $K_1$ are mutually exclusive. Reading from the right of chain 48, the first node represents the first term in the first line of Definition 2. If $P_7$ is logic low, only the first intermediate node is connected to the sense amp. If $P_7$ is high, then the next intermediate node will be connected to the sense amp (the second term), etc. Sense amp 10 will respond to the voltage difference between nodes 46 and 48 and pass on a signal at the full logic level to the next circuit in the system.

Figure 5:
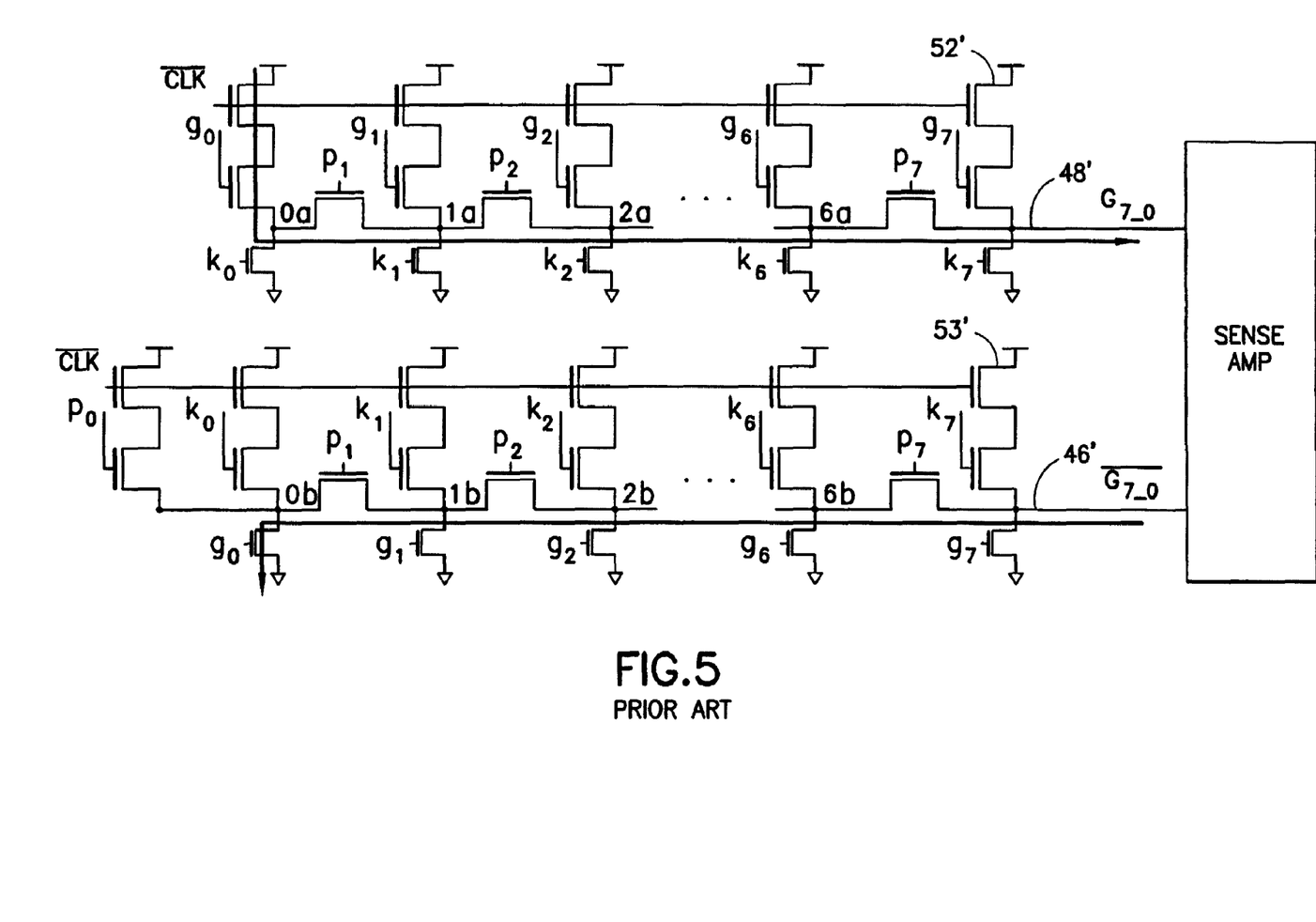
FIG. 5 illustrates a prior art logic module.

The circuit in FIG. 5 is an example of the circuit of FIG. 1A, with sense amp 1 and the remainder of the circuit as an example of logic tree 15'. At the top and bottom of each module, nodes 48', 46' and intermediate nodes (0a–6a, 0b–6b) are floating in the precharge period, in contrast to being predischarged to ground in FIG. 6A. The voltages of those nodes are determined by the logic value in the previous cycle.

Referring again to FIG. 7, the circuits in row 34 each generate 1 bit (and their complements—understood) for each of G, K and P (i.e. each module generates 3 bits and their complements) that pass to an 8-bit carry lookahead adder 36 that generates the six carry bits required (the eight least significant carry bit has already been generated in row 34). Adder 36 carries out the following $$C_{55} = G_{55\_48} + P_{55\_48}G_{47\_40} + \ldots + P_{55\_48} \ldots P_{15\_8}C_7$$

$$C_{55}\# = K_{55\_48} + P_{55\_48}K_{47\_40} + \ldots + P_{55\_48} \ldots P_{15\_8}C_7\#$$

$$C_{47} = G_{47\_40} + P_{47\_40}G_{39\_32} + \ldots + P_{47\_40} \ldots P_{15\_8}C_7$$

$$C_{47}\# = K_{47\_40} + P_{47\_40}K_{39\_32} + \ldots + P_{47\_40} \ldots P_{15\_8}C_7\#$$

...

$$C_{15} = G_{15\_8} + P_{15\_8}C_7$$

$$C_{15}\# = K_{15\_8} + P_{15\_8}C_7\# \quad \text{Definition 3:}$$

Figure 8:
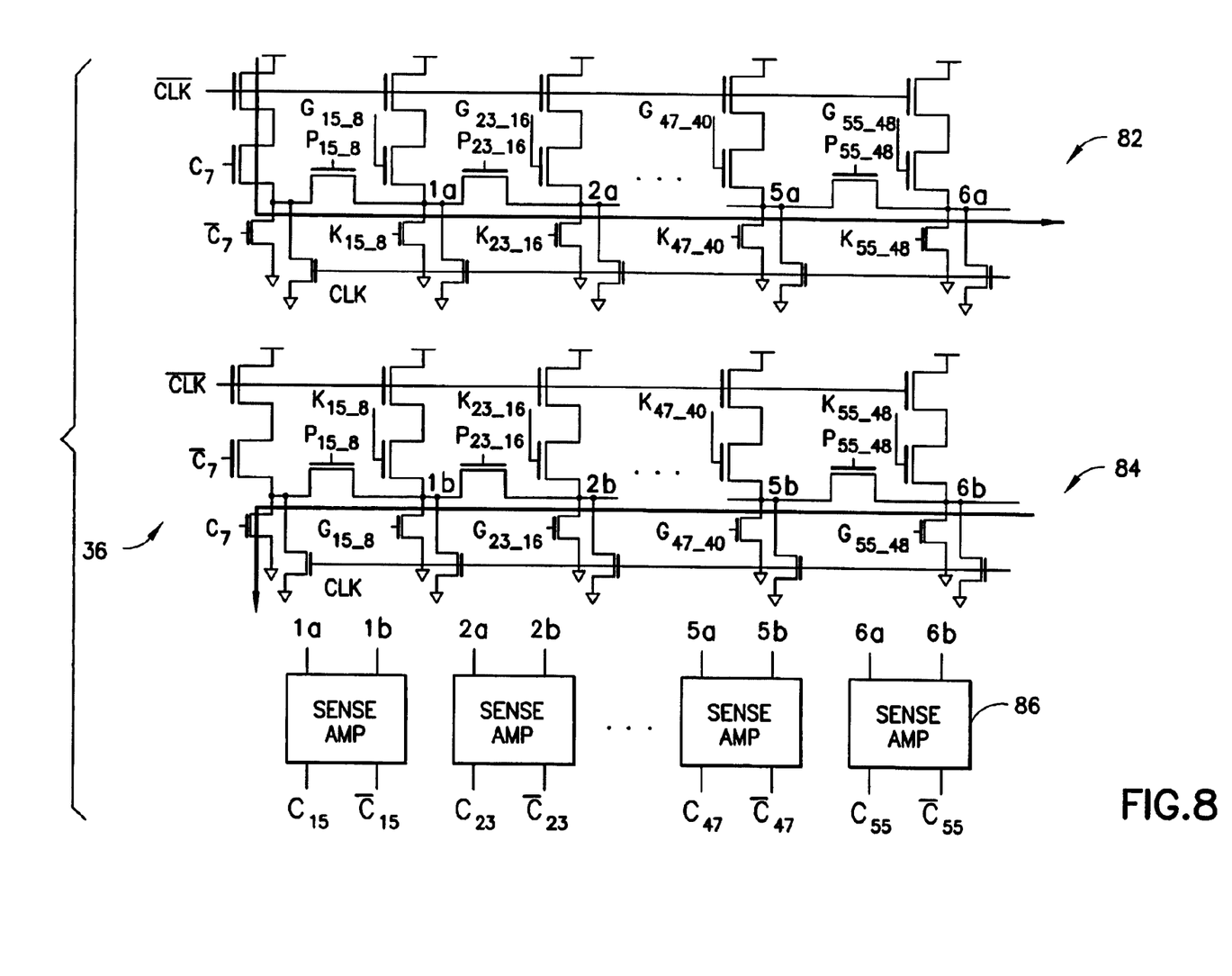
FIG. 8 illustrates a logic module for generating 8 bit skipped global carry signals.

FIG. 8 shows the schematic diagram of multiple output global carry generating circuit 36. Eight-bit skipped global carries ($C_{15}$, $C_{23}$, $C_{31}$, $C_{39}$, $C_{47}$, $C_{55}$) are generated simultaneously. The logic module denoted with 82 generates signals 1a, 2a–6a at intermediate nodes in the chain of source follower transistors from signals G, K and P according to definition 3. These signals feed into sense amps 86 on the bottom row of the Figure. Similarly, module 84 generates signals 1b,–6b. Gate load capacitance at each intermediate node does not degrade the performance significantly since a small swing is enough to trigger sense amplification. Fanout of the first level 8 bit group G/P/K circuit 34 can be minimized because only one global carry generating circuit 36 is needed.

Adder 30 is able to use only a two level carry lookahead because the modules are 8-bit, so that carry back propagation or intermediate carry propagation for carry select adder is not necessary.

Figure 9:
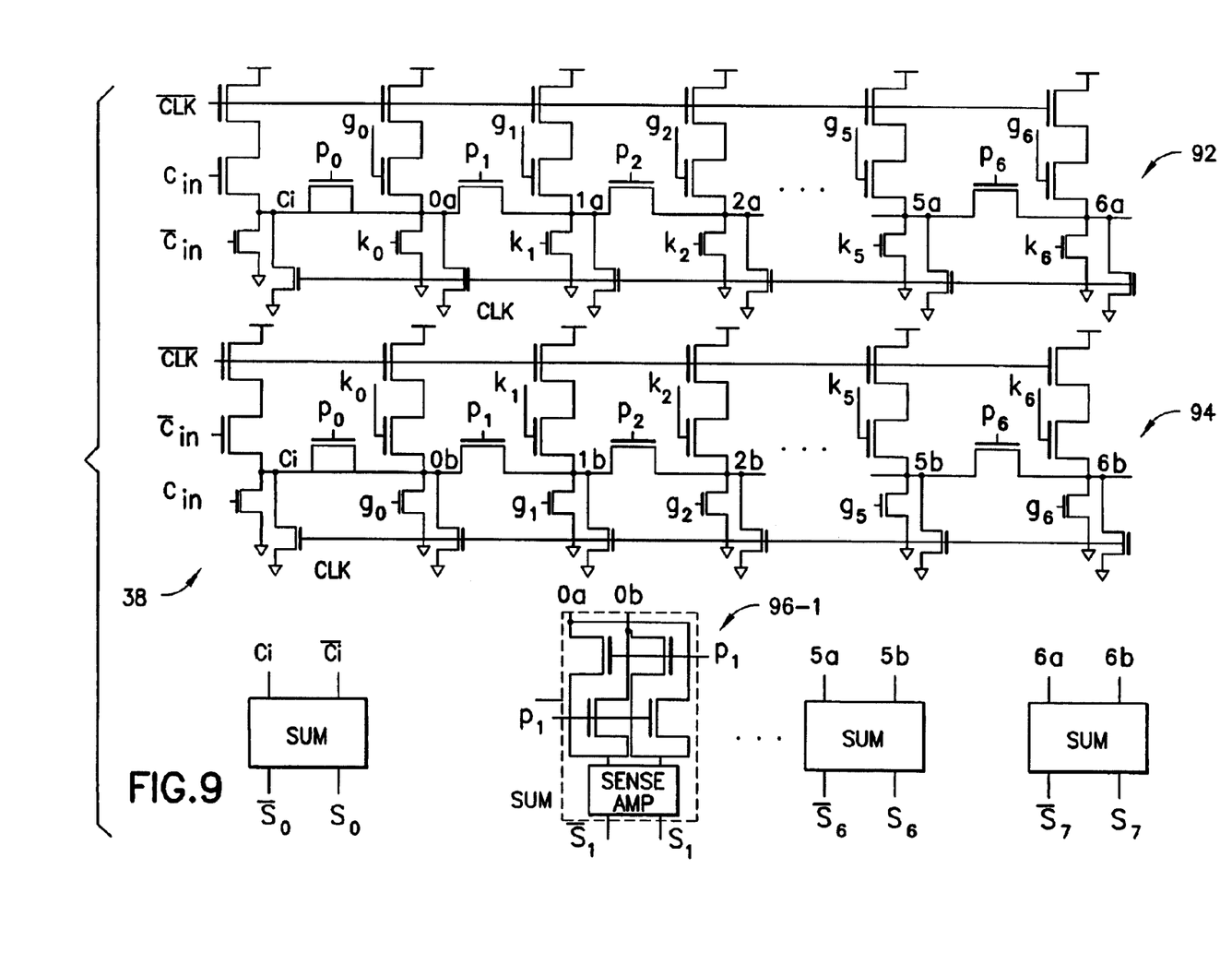
FIG. 9 illustrates a logic module for generating the final sums from the data of FIG. 8.

FIG. 9 illustrates one of two 8-bit Ripple Carry adders that make up units 38. Modules 92 and 94 each generate a bit that goes to a sum circuit, e.g. sum 96-1, that forms bit 1 of the output. The output of one of the adders in unit 38 will be selected in response to a carry bit; e.g. both the outputs of the sum modules 96 in FIG. 9 and corresponding sum modules from the other adder will feed into multiplexers that will select one of the outputs in response to a carry bit. Within units 92 and 94, the top row of transistors, controlled by the Clk# signal, connects a high signal to a transistor controlled by gi that connects to an intermediate node in the central transistor chain. The transistors in the central chain are controlled by signals pi. The intermediate nodes are further connected by transistors connected to Vdd and controlled by ki and a precharge transistor controlled by the Clk signal (that is also connected to Vdd). The outputs of modules 92 and 94 are taken from the intermediate nodes of the central chains of 92 and 94.

One of the two potential sums is selected in each module 38 by a two-input multiplexer responsive to the relevant carry bit. These alternative sums are calculated at the same time that the carry bits are generated in module 36, so that the delay of module 36 is not on the critical delay path. Accordingly, a requirement on the design of module 38 is that its delay be less than the delay for the carry generation process.

The allocation of functions to blocks in this Figure is made for purposes of illustration only and those skilled in the art will readily realize that functions may be performed in different locations. For example, the function of multiplexing could be allocated to a separate block.

Those skilled in the art will appreciate that the invention can be practiced in silicon wafers, silicon-germanium wafers, with various types of transistors, MOSFETs, FINFETs, partially depleted, fully depleted, etc. While the invention has been described in terms of a single preferred embodiment, those skilled in the art will recognize that the invention can be practiced in various versions within the spirit and scope of the following claims.

We claim:

1. An N-bit two level lookahead adder for adding two N-bit numbers, comprising summing means for calculating alternative partial M-bit sums;
    a first set of carry modules for generating $g_i$, $p_i$ and $k_i$ signals for each of the N bits;
    a second set of carry modules, responsive to said $g_i$, $p_i$ and $k_i$ signals, for generating a set of M-bit G, P and K signals therefrom, each of said second set of carry modules having a sense amplifier connected to a logic evaluation module containing two connecting nodes connected to said sense amplifier, two chains of source follower transistors having a first node, a final node and a set of intermediate nodes controllably connected to ground and to a reference voltage by first and second sets of connecting transistors, said final node of each of said chains being connected to one of said connecting nodes;
    first precharge means for precharging each of said set of two connecting nodes to ground;
    means for charging one of said connecting nodes to a reference voltage other than ground in an evaluation mode; and
    a set of output modules, responsive to said set of carry signals, for selecting alternative partial sums and connecting a selected set of said alternative partial sums to a set of output terminals.

2. An adder according to claim 1, comprising a set of partially depleted silicon transistors disposed in an integrated circuit formed in a device layer disposed above an insulating layer on a substrate.

3. An adder according to claim 2, in which said set of partially depleted transistors have floating bodies.

4. An adder according to claim 1, further comprising a global carry module for generating carry signals comprising first and second carry logic modules, each comprising a chain of source follower transistors connected through a series of intermediate nodes, each of said intermediate nodes being connected to ground and to a reference voltage through transistors controlled by said G and K signals, each of said intermediate nodes of said first and second carry logic modules being connected to corresponding first and second inputs of a set of sense amplifiers, the outputs of said set of sense amplifiers being said carry signals.

5. An adder according to claim 4, comprising a set of partially depleted silicon transistors disposed in an integrated circuit formed in a device layer disposed above an insulating layer on a substrate.

6. An adder according to claim 5, in which said set of partially depleted transistors have floating bodies.

7. An adder according to claim 4, comprising a set of field effect transistors formed in a silicon substrate.

8. An adder according to claim 4, comprising a set of field effect transistors formed in a substrate of silicon-germanium alloy.

9. An adder according to claim 4, comprising a set of fully depleted field effect transistors formed in a semiconductor substrate.

10. An adder according to claim 4, comprising a set of fully depleted field effect transistors formed in a silicon-germanium alloy.

11. An adder according to claim 4, comprising a set of FINFET transistors formed in a semiconductor substrate.

12. An adder according to claim 1, comprising a set of field effect transistors formed in a silicon substrate.

13. An adder according to claim 1, comprising a set of field effect transistors formed in a substrate of silicon-germanium alloy.

14. An adder according to claim 1, comprising a set of fully depleted field effect transistors formed in a semiconductor substrate.

15. An adder according to claim 1, comprising a set of fully depleted field effect transistors formed in a layer of silicon-germanium alloy.

16. An adder according to claim 1, comprising a set of FINFET transistors formed in a semiconductor substrate.

17. A method of adding two N-bit numbers comprising:
    calculating alternative partial M-bit sums;
    providing a first set of carry modules for generating $g_i$, $p_i$ and $k_i$ signals for each of the N bits;
    providing a second set of carry modules, responsive to said $g_i$, $p_i$ and $k_i$ signals, for generating a set of M-bit G, P and K signals therefrom, each of said second set of carry modules having a sense amplifier connected to a logic evaluation module containing two connecting nodes connected to said sense amplifier, two chains of source follower transistors having a first node, a final node and a set of intermediate nodes controllably connected to ground and to a reference voltage by first and second sets of connecting transistors, said final node of each of said chains being connected to one of said connecting nodes;

precharging each of said set of two connecting nodes to ground;

charging one of said connecting nodes to a reference voltage other than ground in an evaluation mode; and providing a set of output modules, responsive to said set of carry signals, for selecting alternative partial sums and connecting a selected set of said alternative partial sums to a set of output terminals.

* * * * *